Nov. 27, 1951 — W. M. VENNER ET AL — 2,576,655

PISTON

Filed Jan. 2, 1947

INVENTORS:
WILLIAM M. VENNER
PERCY L. BOWSER, JR.

BY Brununga Sutherland
ATTORNEYS.

UNITED STATES PATENT OFFICE 2,576,655

PISTON

William M. Venner, Clayton, and Percy L. Bowser, Jr., University City, Mo.

Application January 2, 1947, Serial No. 719,842

4 Claims. (Cl. 309—13)

This invention relates to pistons, and, more particularly, trunk pistons adapted for use in internal combustion engines. Such a piston is usually constructed of light metal, such as aluminum, magnesium or alloys thereof. Such a piston usually comprises a head of smaller diameter than the cylinder and a skirt provided with inwardly projecting wrist pin bosses, and which skirt should be as close to the cylinder diameter as is possible. In order to effect this, means must be provided for compensating for the greater rate of thermal expansion of the piston, as compared with that of the cylinder.

One of the objects of this invention, therefore, is to provide a piston of the character described in which increased accuracy of the control of expansion may be obtained.

Further objects will appear from the detail description taken in connection with the accompanying drawings describing and showing an illustrative embodiment of this invention; it is to be understood, however, that this invention is susceptible of various embodiments within the scope of the appended claims.

Generally stated, and in accordance with an illustrative embodiment of this invention, a piston comprising a head, a skirt provided with wrist pin bearings and with thrust faces, is provided with a control element extending across the piston between the piston head and the wrist pin bearings and anchored in one or both of the thrust faces, but free of, i. e. non-anchored with respect to the pin bearing zones of the skirt. The control element may embody parts extending along the thrust faces in a direction transverse to the piston axis, but with one or both of those parts anchored in one or both thrust faces, and with parts extending along and non-anchored with respect to the pin bearing zones of the skirt. The skirt may be separated circumferentially from the head in the regions of one or both thrust faces.

Figure 1:
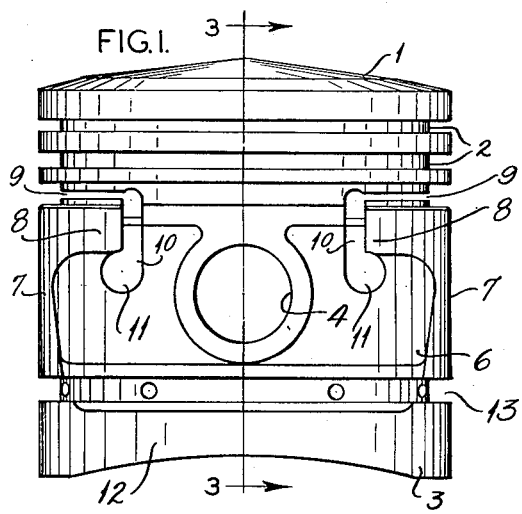
Figure 1 is an elevation taken from the region of the pin boss.

Referring to the accompanying drawings, 1 designates the head of the piston, provided, as usual, with ring grooves 2, and this head is smaller than the cylinder bore. The skirt 3, which is only a few thousandths of an inch smaller than the cylinder bore, is provided with wrist pin bosses or bearings 4. The skirt may be provided with reliefs 6 in the regions of the bosses, in order to provide distinct thrust faces 7. The thrust faces at the top may extend inwardly, as shown at 8, on one or both sides. The head may also be separated from the skirt in one or both thrust face regions by slots 9, and vertical slots may be provided at the end or ends of the circumferential slots, as shown at 10, which may extend underneath the parts 8, as shown at 11. The bottom of the piston skirt may extend completely therearound, as shown at 12, and a ring groove 13 may be provided in the bottom of the skirt. In some cases, one of the thrust faces may be provided with a vertical slot 14.

Figure 3:
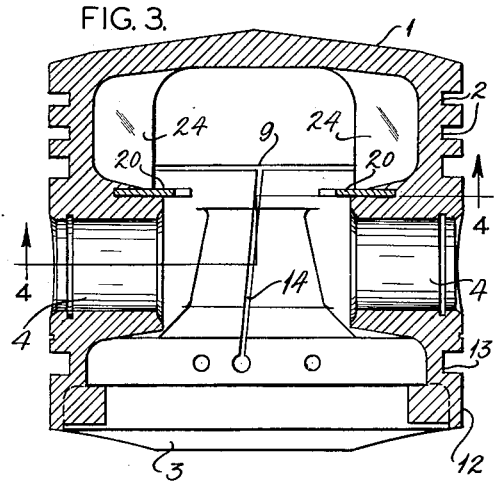
Figure 3 is a section on line 3—3 of Figure 1.
Figure 2:
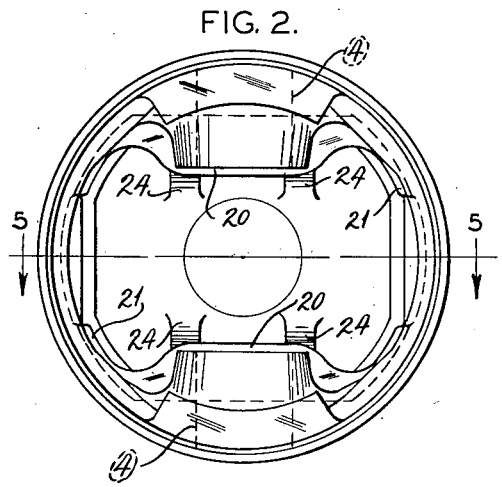
Figure 2 is a bottom view.
Figure 4:
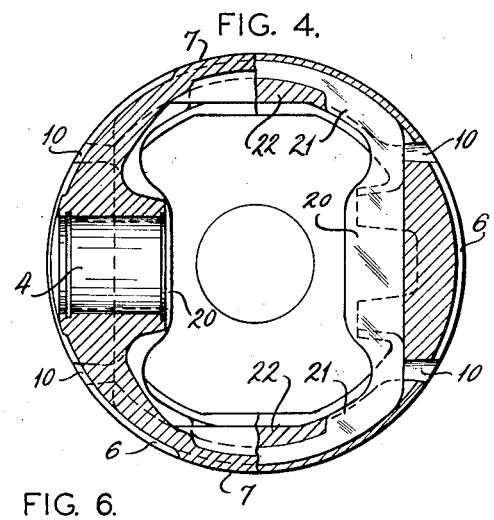
Figure 4 is a section on the line 4—4 of Figure 3.
Figure 5:
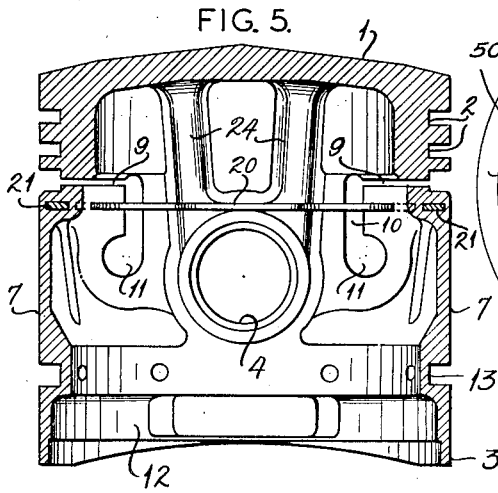
Figure 5 is a section on the line 5—5 of Figure 2.
Figure 6:
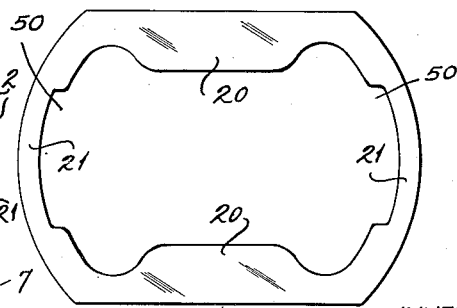
Figure 6 is a detailed face view of the control member 20.

The control element, constructed of steel or any other suitable material having a coefficient of expansion smaller than that of the piston body, and even having a smaller coefficient of expansion than that of cast iron comprises in this particular embodiment, a generally rectangular open plate comprising side parts 20 and circumferential parts 21. The circumferential parts are embedded in the thrust faces, as shown in Figure 4, the metal being cast entirely around the parts 21, even on the inside, as shown at 22 extending into recesses 50 in the circumferential part of the control element. The parts 20 are, however, non-anchored in the piston, simply lying against the top of the pin bosses, as shown in Figure 3. While ribs 24 may extend partially over parts 20, there is no clamping action here, and this may even be avoided by providing the control element with compound before casting, to prevent any seizure of the control element in the regions of the bosses.

The head of the skirt may be round, which also can be the case of the top of the skirt, including the parts 8, and even the parts 12. The skirt, as a whole, may be ground to the usual taper of from .001 to .002 of an inch larger at the bottom than at the top of the skirt. The skirt may, however, be provided with a cam surface with the major diameter at the thrust faces, and with the minor diameter in the regions of the bosses. Thus the cam at the bottom of the skirt may be from .008 to .011 of an inch for a piston three and three-sixteenths of an inch in diameter. The top of the skirt may, however, be round. No relief in the regions of the bosses is really necessary in the skirt. Moreover, separation of the skirt from the head may be omitted, but there may be circumferential slotting in one or both of the thrust faces. One of the thrust faces may also have a vertical slot, if desired.

In a piston constructed in accordance with this invention, the control element will serve to hold the piston in shape. This is due to the fact that the piston is permitted to expand in the regions of the bosses at will, because there is no anchoring of the control element in the boss regions. However, in the regions of the thrust faces the control element will hold the piston against expansion upon heat, as well as contraction at the thrust faces upon expansion in the boss regions.

Having thus described the invention, what is claimed and desired to be secured by Letters Patent is:

1. A piston of the character described, comprising, a head, a skirt depending from said head provided with wrist-pin bearings and with thrust-faces, and a control element embodying parts extending along said thrust faces in a direction transverse to the piston axis, anchored in a limited central section circumferentially of each of said thrust-faces and having parts extending along but free of the pin-bearing zones of said skirt so as to be unaffected by expansion or contraction thereof.

2. A piston of the character described, comprising, a head, a skirt depending from said head provided with wrist-pin bearings and with thrust-faces one of which is separated from said head by a circumferential slot, and a control element extending across said piston and anchored in the central section but through less than the entire circumferential extent of the separated one of said thrust faces and having parts extending along but free of the pin-bearing zones of said skirt so as to be unaffected by expansion or contraction thereof.

3. A piston of the character described, comprising, a head, a skirt depending from said head provided with wrist-pin bearings and with thrust-faces separated from said head by circumferential slots, and a control element extending across said piston and anchored in the central section but through less than the entire circumferential extent of each of said thrust-faces and having parts extending along but free of the pin-bearing zones of said skirt so as to be unaffected by expansion or contraction thereof.

4. A piston of the character described, comprising a head, a skirt depending from said head provided with wrist-pin bearings and with thrust-faces, each of said thrust-faces being separated from said head by a circumferential slot and being defined circumferentially by vertical slots at the ends of the circumferential slot, and a generally rectangular control element lying in a plane transverse to the piston axis, between the wrist-pin bearings and the circumferential slots, a central section of the ends of said control element being imbedded in the central section of but less than the entire circumferential extent of each thrust-face and the sides of said control element extending along but being free of the pin-bearing zones of the skirt.

WILLIAM M. VENNER.
PERCY L. BOWSER, JR.

REFERENCES CITED

The following references are of record in the file of this patent:

UNITED STATES PATENTS

| Number | Name | Date |
| --- | --- | --- |
| 1,730,120 | Jardine | Oct. 1, 1929 |
| 1,881,237 | Nelson | Oct. 4, 1932 |
| 2,083,533 | Long | June 8, 1937 |
| 2,240,967 | Venner et al. | May 6, 1941 |